M. I. M. HANLON & W. ELAND.
SAUCEPAN.
APPLICATION FILED DEC. 27, 1910.
1,004,423.
Patented Sept. 26, 1911.
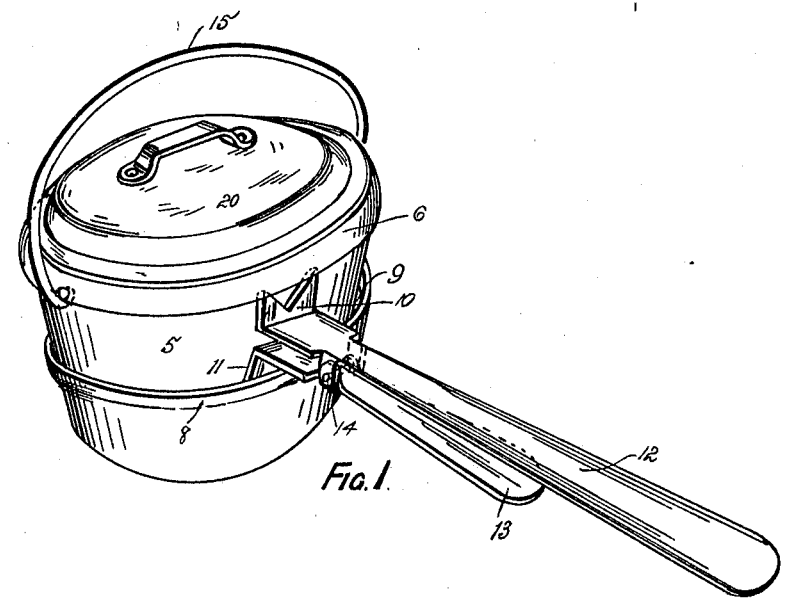
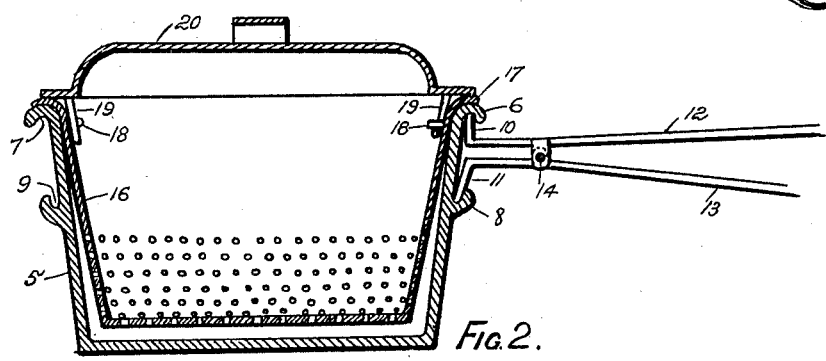
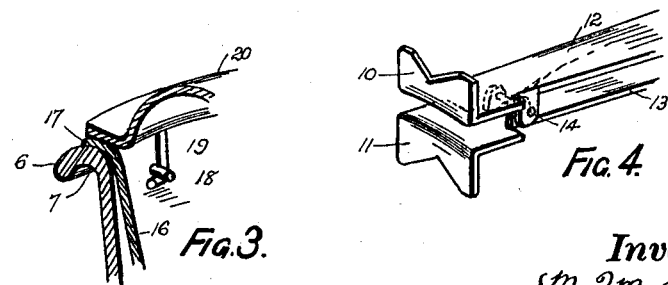
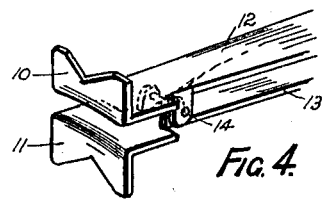

UNITED STATES PATENT OFFICE.

MABEL IDA MAY HANLON AND WILLIAM ELAND, OF NEWTOWN, NEW SOUTH WALES, AUSTRALIA.

SAUCEPAN.

1,004,423. Specification of Letters Patent. Patented Sept. 26, 1911.

Application filed December 27, 1910. Serial No. 599,349.

*To all whom it may concern:*

Be it known that we, MABEL IDA MAY HANLON and WILLIAM ELAND, subjects of the King of Great Britain and Ireland, residing, respectively, at 262 King street and 426 King street, Newtown, in the State of New South Wales, Commonwealth of Australia, have invented certain new and useful Improvements in Saucepans, of which the following is a specification.

It is well known that the projecting handle of an ordinary saucepan is inconvenient when several of these are in use upon a stove or cooking range at one time, and it is considered that a saucepan provided with means for securing a readily attachable and detachable handle in any radial position would be of great utility and convenience inasmuch as one such handle could be used to move in turn (as required) any number of saucepans. A loop or bucket handle would preferably be provided to enable the saucepan to be lifted or carried independently of the detachable handle.

The saucepan is in form similar to those of ordinary construction but is provided with two circumferential bands or ribs, one situated around the upper edge or lip and one about the middle. An annular groove is formed on the under edge of the upper band and on the upper edge of the lower band for the purpose of receiving and holding the gripping lugs of the detachable handle. This handle is provided with two distensible arms each pivoted to the other and so constructed at its end as to be adapted to enter one of the beforementioned grooves in the ribs on the vessel. The said arms are operated so that the said ends enter the said grooves thereby forming a detachable connection of the handle to the saucepan, the said connection being quite secure when the saucepan is lifted by the handle. When, however, it is desired to partially or wholly invert the saucepan the grip-portion of both members is simultaneously grasped by the hand.

A perforated inner vessel is provided, open at the top and designed to be placed within the saucepan and of such size relatively thereto that a small annular space is left between the respective walls thereof. The inner vessel is provided with means whereby the saucepan lid (fitted with suitable dependent lugs) when placed upon the saucepan may by a slight rotating movement be caused to lock with the said inner vessel and form a means of withdrawing it from the saucepan. We do not, however, definitely confine ourselves to the above means for withdrawing the inner vessel.

In order to indicate the practical application of this invention reference will now be made to the accompanying drawings in which:—

Figure 1 is a perspective view of the saucepan complete. Fig. 2 is sectional elevation thereof. Fig. 3 is detail showing the attachment of the lid to the inner vessel. Fig. 4 is a view of the gripping ends of the detachable handle.

The body of the saucepan 5 has an overturned bead 6 around its lip, having formed upon its underside the annular groove 7, and about the middle of the side wall a flange or ring 8 having upon its upper face the annular groove 9.

The grooves 7 and 9 are designed and adapted to receive the oppositely disposed lugs 10 and 11 respectively of the upper and lower members 12 and 13 forming the attachable and detachable handle. The said members are provided with lugs and are pivoted together thereby at 14.

A loop or bucket handle 15 may be provided to enable the saucepan to be lifted or carried independently of the detachable handle the utensil being thus of utility as an ordinary boiler or can.

The inner vessel 16 is perforated and is provided around its upper edge with an outwardly turned flange 17 designed to rest upon the overturned bead 6. Lugs or pins 18, 18, project inwardly from the side wall of the inner vessel and are designed to engage with angle-lugs 19, 19, dependent from a lid or cover 20 when the latter, being placed upon the vessel, is given a slight turn in the required direction. By this means the inner vessel may be withdrawn from the saucepan. The lid 20, however, is usable upon the saucepan itself should the inner vessel not be required.

What we claim and desire to secure by Letters Patent is:—

1. A saucepan having a pair of annular flanges on the outside thereof spaced a suitable distance apart, and a detachable handle comprising a pair of arms pivoted together intermediate of their length and having angular extensions at one end thereof adapted to engage said flanges on the saucepan.

2. A saucepan having a pair of annular flanges on the exterior thereof spaced a suitable distance apart, the upper of said flanges extending outwardly and downwardly and the lower of said flanges extending outwardly and upwardly, and a detachable handle comprising a pair of arms mutually pivoted intermediate of the length thereof and having outwardly offset extensions at one end adapted to engage the annular flanges aforesaid.

Signed at Sydney, New South Wales, Australia, this 9th day of November 1910.

MABEL IDA MAY HANLON.
WILLIAM ELAND.

In the presence of—
WM. NEWTON,
CHAS. HATTON.

Copies of this patent may be obtained for five cents each, by addressing the "Commissioner of Patents, Washington, D. C."